April 12, 1949.    R. W. JENNY    2,466,813
JET PROPELLED LIFT ROTOR
Filed July 8, 1944
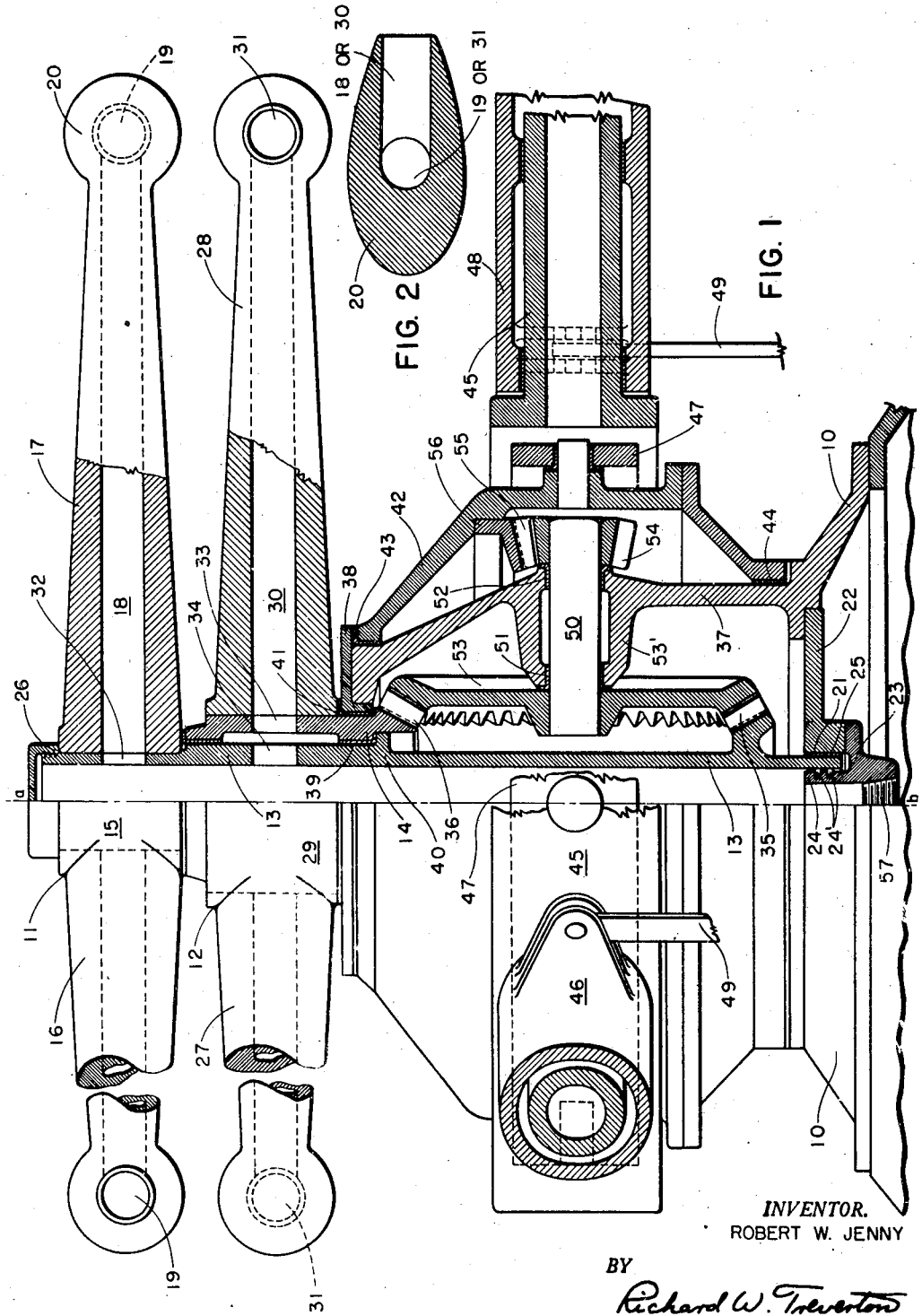
INVENTOR.
ROBERT W. JENNY
BY
Richard W. Treverton
ATTORNEY.

Patented Apr. 12, 1949

2,466,813

UNITED STATES PATENT OFFICE 2,466,813

JET-PROPELLED LIFT ROTOR

Robert W. Jenny, East Paterson, N. J., assignor to Curtiss-Wright Corporation, a corporation of Delaware Application July 8, 1944, Serial No. 544,118

10 Claims. (Cl. 170—135.71)

1

The invention relates in general to a power transmission in which power originates in high speed jet propelled rotating parts and is transferred through suitable reducing gearing to drive mechanism at a lower speed, and the invention specifically relates to a helicopter driving mechanism for driving the helicopter lift rotor from a jet propelled prime mover.

The primary object of the invention is to provide a simplified, compact and efficient transmission mechanism for utilizing the rotative power derived from one or more jet propelled sources, collecting the power from the several sources so as to utilize the collected power to drive mechanism operating best at some speed lower than that of the jet propelled source or sources.

With reference to its utilization as a power drive of a helicopter, an object of the invention is to provide a simplified light form of rotor lift driving mechanism which will at the same time provide for a torque cancelling effect on each other and thus tending to cancel their torque effect on the fuselage of the associated helicopter.

Various other objects and advantages of the invention will be in part obvious from an inspection of the accompanying drawings and in part will be more fully set forth in the following particular description of one form of power transmission embodying the invention, and the invention also consists in certain new and novel features of construction and combination of parts hereinafter set forth and claimed.

In the accompanying drawings:

Figure 1 is a view partly in vertical axial section and partly in side elevation of a preferred embodiment of the invention with parts broken away and other parts omitted; and Figure 2 is a detailed vertical sectional view of the outer end of any one of the rotor arms.

In the drawing there is shown a structural part of the helicopter represented symbolically by the upstanding hollow support 10. A pair of superposed rotors 11 and 12 are provided respectively with shafts 13 and 14 sometimes hereinafter referred to as hollow jet rotor shafts disposed in telescopic relation one within the other and mounted in the support for rotation about a common vertical axis a—b and in parallel horizontal planes. The inner shaft 13 extends substantially the full length of the support 10, projects above the same and is provided at its outer upper end with the rotor 11 secured thereto to rotate the shaft. The rotor 11 includes a ring-like hub 15 and a pair of radially extending

2 outstanding hollow arms 16—17. The arms 16—17 are each provided with an axially extending bore 18 which leads to an ejecting nozzle 19 centered in a stream-lined head 20 projecting radially from the outer end of each arm. The nozzles are so arranged naturally that their rotative efforts are additive. The upper rotor is thus caused to turn clockwise as you look down on Figure 1 by the reaction of the jets of fluid on its associated arms 16—17.

The lower end of the inner shaft 13 intrudes into an opening 21 formed in a closure plate 22 forming a part of the support 10. A sealing ring 23 secured to the plate 22 at its opening has a sealing ring collar 24 intruded into the lower end of the shaft 13 and carries sealing rings 24' which, in combination with the plain bearing 25, act to prevent leakage out of the shaft 13 at its lower end. A cap 26 closes the upper open end of shaft 13 and acts on hub 15 to secure the rotor 11 from upward movement.

The rotor 12 is likewise provided with two radially disposed outstanding arms 27 and 28, integral with their hub 29. The arms of rotor 12 are likewise each provided with a fluid conducting bore 30 which leads to an ejecting or blast nozzle 31 in a head corresponding to head 20 forming the outer end of the arm. The nozzles 19 and 31 point in relatively reversed directions as noted by the broken and full lines of the showings in Figure 1 and thus the rotor 12 turns in a counterclockwise direction looking down upon the showing. The shaft 13 is provided with an opening 32 forming a continuance of the bore 18. Likewise each of the bores 30 of rotor 12 is at all times in fluid communication with the interior of the shaft 13 by aligned openings 33 in shaft 14 and 34 in shaft 13. It is appreciated that all of the nozzles 19 and 31 are in open communication with the bore of the inner shaft and that propelling fluid is supplied from the bore of the inner shaft to the bores of all of the arms, through the several shaft openings 32, 33 and 34. As the ejecting nozzles of the two rotors are pointing in opposite directions, the associated rotors are driven by jet propulsion one in a clockwise and the other in a counterclockwise direction. It is not intended that the rotors 11 and 12 should have any air screw effects and on the contrary its arms are either circular in cross section or preferably are streamlined to reduce air resistance thereon. The inner shaft 13 is provided adjacent its lower end with a bevel pinion 35 and the outer shaft 14 is provided at its lower end with a jet rotor pinion 36. The support 10 includes an upstanding annular wall 37 provided with a top plate 38 through which the shaft 14 protrudes. A plain bearing 39 is located between shaft 14 and shaft 13 just above stop shoulder 40 on shaft 13. A plain bearing 41 is located between shaft 14 and the top plate 38.

Mounted to rotate about the outer cylindrical side of the wall 37 is a lift rotor hub 42 mounted to turn about plain bearings 43 and 44 at upper and lower ends of the hub. The rotor hub is provided with a plurality of oppositely disposed tiltable blades, these being used in the illustrated device, a portion of two of which is shown at 45 and 46. The rotor hub is universally mounted on the wall 37 of structure 10 in this showing by a gimbal ring 47. The angle of attack of an airfoil section 48 of the blade is controlled through a tilting control, part of which is shown at 49 but which is no part of the present invention and constitutes the subject matter of another application about to be filed.

The rotor hub 42 is driven from both of the rotors 11 and 12 by mechanism which includes a lift rotor hub drive shaft 50 mounted in the wall 37 of the support through bearings 51 and 52 carried by a boss 53' forming an inward extension from the cylindrical wall 37. At its inner end this hub drive shaft 50 is provided with a large bevel gear 53 sometimes hereinafter referred to as a jet rotor interconnector gear, the teeth of which face inwardly towards the axis a—b and meshes at its upper portion with the jet rotor pinion 36 and at its lower portion with the jet rotor pinion 35 at the lower end of the inner shaft 13. It is noted that the gear 53 is of materially greater diameter and thus is provided with a greater number of teeth than the pinions with which it meshes, and there is thus provided a reduction in speed of the hub drive shaft from the telescoped shafts at a ratio depending upon the ratio of the teeth in the combined gear-pinion assembly illustrated.

The opposite or outer end of the drive shaft 50 is provided with a small rotor hub drive pinion 54 close to bearing 52. The pinion 54 is slightly beveled and meshes with a large rotor hub drive gear 55 formed integral with ring 56 attached to the upper portion of the rotor hub. It is noted that the gear 55 is of materially larger diameter and thus contains a larger number of teeth than the rotor hub drive pinion 54 and there is thus provided another or second speed reduction in the gear transmission between the driving shafts 13, 14 and the rotor hub 42.

It is intended that fluid for actuating the jet propelled power supplying rotors be supplied from mechanism mounted in the fuselage of the machine and connected to the seal or closure plate 23 through a coupling engaging the threads 57 formed in the base of the ring 23.

In operation, and assuming the presence of a suitable source of actuating fluid in the bore of the inner shaft 13, such fluid will be conveyed through the several openings and bores to the two sets of nozzles with the result that the rotors 11 and 12 will turn at speed high enough to allow the jets to have a velocity suitable for efficient operation. The power thus originating in the rotors is transmitted through the interconnector gear 53 which acts not only to reduce the speed of the hub drive shaft to the relatively low speed at which lifting rotors perform efficiently, but it also acts to translate the opposite rotation of the rotors into a unidirectional rotation of the hub drive shaft. From the rotor hub drive shaft the speed is further reduced through the gear set 54 and 55 thus effecting a second step in the total gear reduction. The propelling rotors 11 and 12 are of the same radial length and are of very much less length than the rotor lift blades 48, and in illustrated disclosure the rotors 11 and 12 have a disk area small enough to eliminate aerodynamic interference between them and the lift rotors.

I claim:

1. In a helicopter driving mechanism, the combination of a pair of hollow jet rotor shafts supported one from the other in telescopic relation for rotation about a common vertical axis, a pair of torque compensating jet rotors not intentionally possessing any air screw effects, one for each shaft and connected to drive its associated shaft by jet propulsion said rotors disposed to turn in parallel horizontal planes, each jet rotor provided with a blast nozzle with the nozzle of one pointing in one rotative direction in the plane of rotation of its associated rotor and the nozzle of the other pointing in the opposite direction in the plane of rotation of its associated rotor to cause the shafts to rotate in opposite directions, a lift rotor drive shaft mounted for rotation about a second axis extending at right angles to the first named axis, a lifting rotor having its blade mounted for rotation in a horizontal plane about said first axis, a pinion and gear combination including a large bevel jet rotor interconnector gear secured to the lift rotor drive shaft and a pair of bevel jet rotor pinions engaging the gear at diametrically opposite points, one of the pinions driven from one of the telescoped shafts and the other driven from the other telescoped shaft, a lift rotor drive bevel pinion carried by the lift rotor drive shaft and facing inwardly towards the large bevel gear, and a lift rotor drive gear secured to the hub of the lifting rotor, facing outwardly and meshing with said pinion, and means for supplying jet propulsion fluid through the innermost of the telescoped shafts and through both driving rotors to their associated nozzles whereby the lifting rotor is driven by power taken from the pair of jet propelled torque compensating rotors.

2. A helicopter including an upstanding structural part forming a support, a pair of driving rotors, including a pair of upstanding drive shafts telescoped one within the other to form a driving unit journaled in the support for rotation about a common vertical axis of said shafts, each provided at their lower ends with a pinion, each rotor provided with a nozzle for driving its associated rotor by jet propulsion, with the nozzle of one rotor discharging in the direction opposite from that of the other and in a different plane, thus turning the rotors in opposite directions to provide a mutual torque cancelling effect, a lift rotor including a hub journaled on the support for rotation about said common axis and having rotor lift blades hinged thereto, a lift rotor hub drive shaft journaled in the support for rotation about a horizontal axis, intersecting said common axis, a compound gear-pinion drive including a large bevel interconnector gear secured to said hub drive shaft at one end thereof projecting both above and below the plane of the rotor lift blades, in mesh with both of said drive shaft pinions and driven thereby in one rotative direction, and a reducing gear drive between the other end of said hub drive shaft and the lift rotor hub.

3. In a helicopter driving mechanism, the combination of a low speed bladed lifting rotor including a hollow rotor hub, two high speed jet propelled rotors rotating in opposite directions intergeared but otherwise functionally independent of each other, tending to provide for torque cancelling effect on each other and coacting to provide the source of rotative power for sustaining and driving the associated helicopter, all of said rotors mounted for rotation in closely related parallel planes and turning about a common vertical axis, and a gear train operatively connecting the lifting rotor and the two jet propelled rotors to cause the lifting rotor to turn in one direction under power derived from the oppositely turning jet propelled rotors, said gear train including a reducing change-speed device housed within the rotor hub for reducing the relatively high speed of the jet propelled rotors to the relatively low speed desired in the lifting rotors of helicopters.

4. In a helicopter drive, the combination of three rotors mounted for rotation about a common and vertically extending axis, one of said rotors having a relatively large radius and constituting a lift rotor adapted to turn at a relatively slow speed and the other two each having a relatively small radius, being substantially free of air screw capacity and adapted to turn at a relatively higher speed, said two small radius rotors provided with nozzles directing their discharges into parallel and opposite planes each above the plane of the lift rotor to cause them to rotate in opposite directions thereby to form a pair of torque rotors coacting to have an inherent torque compensating effect on each other, a train of gears connecting the three rotors, said train including a gear and pinion set comprising an interconnector gear meshing with a pinion on each of said torque rotors to provide a first speed reduction and to translate the opposite rotation of the torque rotors into a unilateral rotation in the balance of the gear train leading from the interconnector gear to the lifting rotor, said balance of the gear train including a gear set providing a second speed reduction in the train whereby the lifting rotor is driven at a relatively low speed from the relatively high speed of the pair of torque rotors through two speed reducing mechanisms.

5. In a helicopter drive, the combination of three rotors mounted for rotary movement about a common axis, one of the rotors having a relatively large diameter and provided with blades to form an air screw, the other two rotors forming a source of rotative power, each having a relatively small diameter and provided with a pinion, a propulsion nozzle and with means for supplying a propelling fluid to its nozzle, said nozzles discharging in opposite rotary directions in vertically offset parallel planes to provide a torque compensation effect, an interconnector gear in mesh with both pinions, and thus acting to cause them to turn in unison in their opposite directions of rotation, and a reducing gear train between the interconnector gear and the air screw rotor.

6. In a device of the class described, the combination of three rotors mounted one above the other for rotation about a vertical axis, the two upper rotors each constituting a source of power for rotating itself having a diameter of the order of three and one-half feet and having no air-screw characteristics, the lowermost rotor having a diameter of the order of thirty feet and having air-screw characteristics, means for driving the two upper rotors by jet propulsion in opposite directions to provide a mutual torque cancelling effect and at such relatively high speed as may be imposed thereon by the jet propulsion and a speed reducing gear drive operatively connected to drive the lowermost rotor at relatively low speed from the two high speed jet propelled rotors.

7. In a helicopter, the combination of a hollow upstanding support, a drive shaft journaled in the support and extending horizontally through an outlining wall thereof, said drive shaft provided at its inner end with a large bevelled interconnector gear and at its outer end with a bevel rotor hub drive pinion, a lift rotor hub journaled on the support for rotation about a vertical axis, said hub provided with a large hub drive gear meshing with said pinion, two sources of power including a pair of jet propelled rotors disposed one above the other and above the support, the lower rotor provided with a short shaft depending therefrom, intruded into the top of the support and provided with a pinion meshing with the interconnector gear at its upper portion, a bearing for said short shaft at the point where it intrudes into the top of the support and close to its associated pinion, the upper rotor provided with a second relatively long rotor shaft depending therefrom extending telescopically through said short shaft, means at the lower end of long shaft for mounting the same for rotary movement, said long shaft extending past the axis of the interconnector gear and provided with a pinion adjacent said lower mounting means meshing with the interconnector gear at its lower portion.

8. In a helicopter, the combination of a lift device and a pair of drive elements rotating on a common axis, said drive elements having jet propulsion means discharging in opposite rotative directions to cause said elements to rotate oppositely, each element carrying therewith a primary drive gear, a driven gear meshing with said primary drive gears and mounted for rotation about an axis fixed with respect to the helicopter, a secondary drive gear rotatable with said driven gear, and a gear rotatable with the lift device and driven by said secondary drive gear.

9. In a helicopter, the combination of a lift device and a pair of drive elements rotating on a common axis, said drive elements having jet propulsion means discharging in opposite rotative directions to cause said elements to rotate oppositely, each element carrying therewith a primary drive gear, a driven gear of larger diameter meshing with and rotated at reduced speed by said primary drive gears, a secondary drive gear rotatable with said driven gear about an axis fixed with respect to the helicopter, and the lift device having rotatable therewith a gear of larger diameter than the secondary drive gear and meshing with the latter for being driven thereby at a reduced speed.

10. In a helicopter, a lifting rotor and a drive assembly rotating on a common substantially upright axis, said drive assembly comprising a tubular element concentric with said axis and a hollow arm extending substantially radially from said element, said arm having at its outer end a substantially tangentially directed nozzle for discharging into the atmosphere fluid which passes into the nozzle through said tubular element and hollow arm, said drive assembly being rotated by reaction against the latter of the discharging fluid, a first pinion carried by said drive element and rotating as a unit therewith about said common axis, said pinion meshing with a first gear rotatable about an axis other than said common axis and which is in fixed relationship to the helicopter, said first pinion rotating said first gear at a reduced speed, a second pinion driven by said first gear and meshing with a ring gear encircling said tubular element, said ring gear being carried by and being rotatable with said lifting rotor about said common axis and said ring gear being rotated by said second pinion at a further reduced speed.

ROBERT W. JENNY.

REFERENCES CITED

The following references are of record in the file of this patent:

UNITED STATES PATENTS

| Number | Name | Date |
|---|---|---|
| No number | Conley | May 15, 1834 |
| 99,548 | Faulkner | Feb. 8, 1870 |
| 1,021,521 | Heroult | Mar. 26, 1912 |
| 1,408,899 | Maple | Mar. 7, 1922 |
| 1,584,810 | Sargent | May 18, 1926 |
| 2,058,361 | Sherwood | Oct. 20, 1936 |
| 2,396,130 | Sbrilli | Mar. 5, 1946 |
| 2,397,357 | Kundig | Mar. 26, 1946 |
| 2,425,904 | Vernon | Aug. 19, 1947 |
| 2,437,700 | MacFarland | Mar. 16, 1948 |

FOREIGN PATENTS

| Number | Country | Date |
|---|---|---|
| 12,217 | Great Britain | 1848 |
| 287,504 | Italy | July 23, 1931 |
| 366,450 | Great Britain | 1930 |
| 375,975 | France | July 27, 1907 |
| 427,217 | France | May 22, 1911 |